United States Patent
Mohlin et al.

(10) Patent No.: US 9,625,006 B2
(45) Date of Patent: Apr. 18, 2017

(54) SEVEN SPEED DUAL CLUTCH TRANSMISSION

(71) Applicants: Mikael B. Mohlin, Kungälv (SE); Tejinder Singh, Commerce Township, MI (US); Patrick S. Portell, Clarkston, MI (US); David M. Zini, Novi, MI (US)

(72) Inventors: Mikael B. Mohlin, Kungälv (SE); Tejinder Singh, Commerce Township, MI (US); Patrick S. Portell, Clarkston, MI (US); David M. Zini, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 587 days.

(21) Appl. No.: 13/621,562

(22) Filed: Sep. 17, 2012

(65) Prior Publication Data

US 2014/0080654 A1 Mar. 20, 2014
US 2016/0298734 A9 Oct. 13, 2016

Related U.S. Application Data

(63) Continuation of application No. 12/715,286, filed on Mar. 1, 2010, now Pat. No. 8,266,977.

(51) Int. Cl.
*F16H 3/00* (2006.01)
*F16H 3/62* (2006.01)
*F16H 3/08* (2006.01)

(52) U.S. Cl.
CPC .............. *F16H 3/62* (2013.01); *F16H 3/006* (2013.01); *F16H 2003/0807* (2013.01); *F16H 2200/0056* (2013.01); *Y10T 74/19233* (2015.01)

(58) Field of Classification Search
CPC ....... F16H 2003/008; F16H 2003/0807; F16H 2200/0056
USPC ................ 475/198; 74/329, 331, 340; 1/198
See application file for complete search history.

(56) References Cited

U.S. PATENT DOCUMENTS

| | | | |
|---|---|---|---|
| 6,209,407 B1 | 4/2001 | Heinzel et al. | |
| 6,250,171 B1 | 6/2001 | Sperber et al. | |
| 7,225,696 B2 | 6/2007 | Gitt | |
| 7,240,578 B2 | 7/2007 | Ogami et al. | |
| 7,340,973 B2 | 3/2008 | Hiraiwa | |
| 7,367,919 B2 | 5/2008 | Fahland et al. | |
| 7,409,886 B2 | 8/2008 | Gitt | |
| 7,690,278 B2 | 4/2010 | Burgardt et al. | |
| 2003/0069103 A1* | 4/2003 | Ibamoto | F16H 3/126 475/5 |

(Continued)

FOREIGN PATENT DOCUMENTS

| | | |
|---|---|---|
| DE | 102006016059 A1 | 10/2007 |
| DE | 102006016397 A1 | 10/2007 |

(Continued)

*Primary Examiner* — Stacey Fluhart

(57) ABSTRACT

A transmission includes an input member, an output member, first and second interconnecting members, first and second countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

36 Claims, 1 Drawing Sheet

(56) References Cited

U.S. PATENT DOCUMENTS

| | | |
|---|---|---|
| 2003/0121343 A1 | 7/2003 | Berger et al. |
| 2005/0115345 A1 | 6/2005 | Gumpoltsberger et al. |
| 2005/0193848 A1 | 9/2005 | Gitt |
| 2006/0117882 A1 | 6/2006 | Gitt |
| 2006/0169078 A1 | 8/2006 | Hiraiwa |
| 2006/0219033 A1 | 10/2006 | Gitt |
| 2007/0022835 A1 | 2/2007 | Kilian et al. |
| 2007/0214906 A1 | 9/2007 | Fahland et al. |
| 2007/0240530 A1 | 10/2007 | Ogami et al. |
| 2007/0277634 A1* | 12/2007 | Komori .................. F16H 3/006 74/331 |
| 2007/0289399 A1 | 12/2007 | Tanba et al. |
| 2008/0034905 A1 | 2/2008 | Hatori et al. |
| 2008/0047378 A1 | 2/2008 | Borgerson et al. |
| 2008/0047379 A1 | 2/2008 | Borgerson et al. |
| 2008/0134818 A1 | 6/2008 | Gitt |
| 2008/0134820 A1 | 6/2008 | Bjorck et al. |
| 2008/0141808 A1 | 6/2008 | Gumpoltsberger |
| 2008/0196526 A1 | 8/2008 | Singh et al. |
| 2008/0202265 A1 | 8/2008 | Hendrickson et al. |
| 2008/0202266 A1 | 8/2008 | Hendrickson et al. |
| 2008/0202267 A1 | 8/2008 | Hendrickson et al. |
| 2008/0202268 A1 | 8/2008 | Carey et al. |
| 2008/0245166 A1* | 10/2008 | Baldwin ......................... 74/331 |
| 2009/0249907 A1* | 10/2009 | Singh et al. .................... 74/340 |
| 2010/0251840 A1 | 10/2010 | Mohlin et al. |
| 2010/0257962 A1* | 10/2010 | Recker et al. .................. 74/331 |
| 2010/0275707 A1* | 11/2010 | Rieger ............................. 74/331 |
| 2010/0288064 A1* | 11/2010 | Singh et al. .................... 74/330 |
| 2010/0294058 A1* | 11/2010 | Singh et al. .................... 74/330 |
| 2010/0294059 A1* | 11/2010 | Singh et al. .................... 74/330 |
| 2011/0138944 A1* | 6/2011 | Mohlin et al. ................. 74/331 |
| 2012/0079903 A1* | 4/2012 | Garabello et al. ............. 74/331 |
| 2012/0174703 A1* | 7/2012 | Ross et al. ..................... 74/650 |

FOREIGN PATENT DOCUMENTS

| | | | |
|---|---|---|---|
| EP | 1 589 257 B1 | 6/2008 | |
| KR | 1020070086201 A | 3/2009 | |
| WO | WO2005093289 A1 | 10/2005 | |
| WO | WO2006106534 A1 | 10/2006 | |
| WO | WO2006128626 A1 | 12/2006 | |
| WO | WO2011123019 | * 10/2011 | .................... 475/209 |

\* cited by examiner

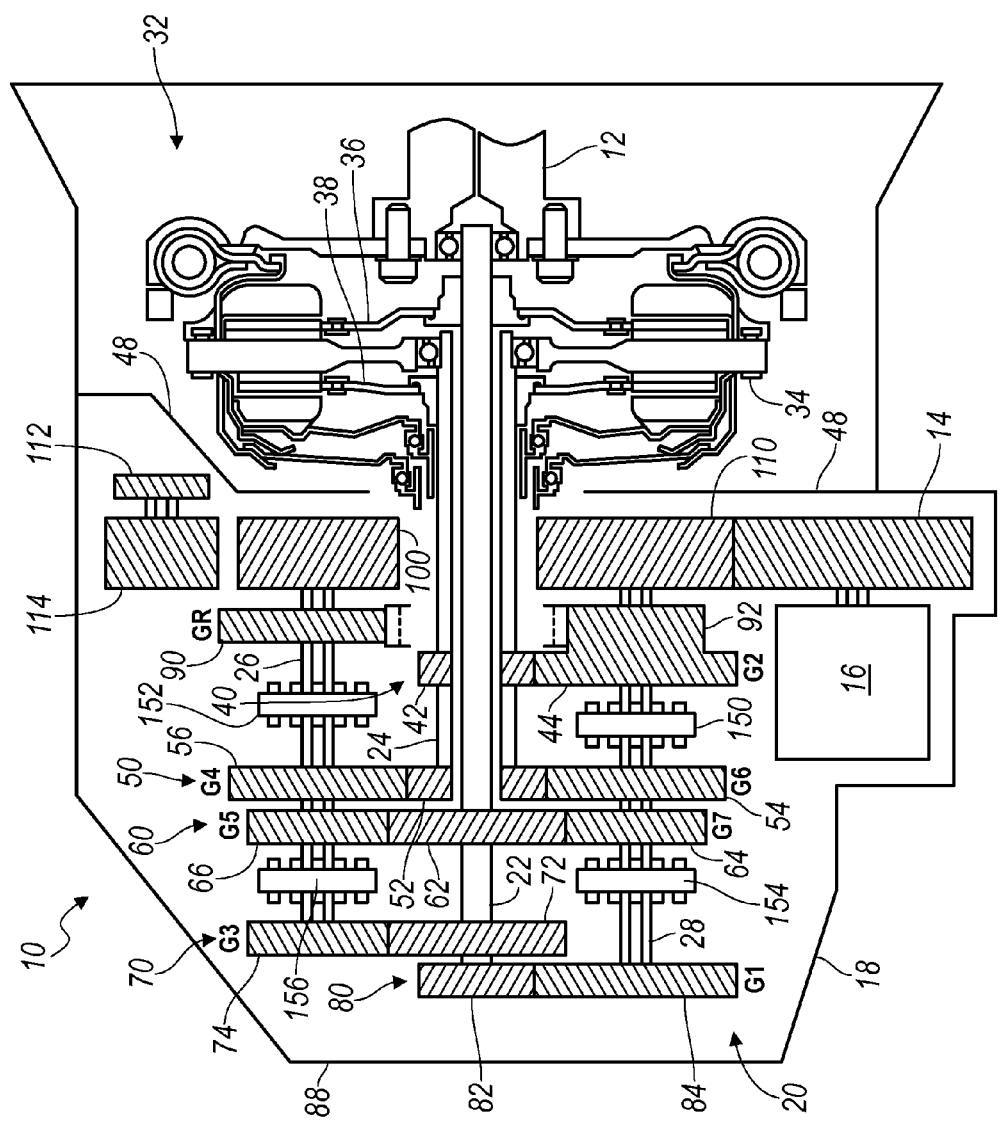

SEVEN SPEED DUAL CLUTCH TRANSMISSION

CROSS-REFERENCE TO RELATED APPLICATIONS

This application is a continuation of U.S. application Ser. No. 12/715,286 filed Mar. 1, 2010. The disclosure of the above application is incorporated herein by reference.

TECHNICAL FIELD

The present disclosure relates to transmissions and more particularly to a compact, dual clutch multiple speed transmission having three axes to establish seven or more gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output member, first and second shaft members, first and second countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In one aspect of the present invention, the transmission includes five co-planar gear sets.

In another aspect of the present invention, two of the five co-planar gear sets are configured to produce two gear ratios each and two other of the five co-planar gear sets are configured to produce one gear ratio each.

In yet another aspect of the present invention, the transmission includes four synchronizer assemblies driven by four rail and fork assemblies.

In yet another aspect of the present invention, the four synchronizer assemblies include four two-way or double sided synchronizers.

In yet another aspect of the present invention, the transmission is operable to provide at least seven forward speed ratios.

In still another aspect of the present invention, a transmission is provided having a transmission housing, an input member and an output member rotatably supported within the transmission housing, a first, second, third, fourth, and fifth gear set, a first and second interconnecting member, a first countershaft and a second countershaft, a dual clutch assembly and four synchronizer assemblies.

In still another aspect of the present invention, the first gear set includes a first gear in mesh with a second gear and a third gear in mesh with the second gear. The second gear set includes a first gear in mesh with a second gear and a third gear. The third gear set includes a first gear in mesh with a second gear and a third gear. The fourth gear set includes a first gear in mesh with a second gear. The fifth gear set includes a first gear in mesh with a second gear.

In still another aspect of the present invention, the first gear set is adjacent the input member, the second gear set is adjacent the first gear set, the third gear set is adjacent the second gear set, the fourth gear set is adjacent the third gear set, and the fifth gear set is adjacent the fourth gear set and end wall of the transmission housing.

In still another aspect of the present invention, the first interconnecting member is rotatably supported within the transmission housing. Each of the first gear of the third, fourth and fifth gear set are rotatably fixed for common rotation with the first interconnecting member.

In still another aspect of the present invention, the second interconnecting member is rotatably supported within the transmission housing wherein each of the first gear of the first and second gear sets are rotatably fixed for common rotation with the second interconnecting member. The second interconnecting member is concentric with the first interconnecting member and at least partially surrounds the first interconnecting member.

In still another aspect of the present invention, the first countershaft is rotatably supported within the transmission housing and spaced apart from and parallel with the first and second interconnecting members. The third gear of the first gear set, the third gear of the second gear set, the third gear of the third gear set and the second gear of the fourth gear set are each selectively connectable for common rotation with the first countershaft.

In still another aspect of the present invention, the second countershaft rotatably supported within the transmission housing and spaced apart from and parallel with the first and second interconnecting members. The second gear of the first gear set and the second gear of the second gear set are each selectively connectable for common rotation with the second countershaft.

In still another aspect of the present invention, the dual clutch assembly has a first and second clutch for selectively interconnecting the input member with at least one of the first interconnecting member and the second interconnecting member.

In still another aspect of the present invention, the first synchronizer assembly selectively connects at least one of the second gear of the first gear set and the second gear of the second gear set to the second countershaft shaft.

In still another aspect of the present invention, the second synchronizer assembly selectively connects at least one of the third gear of the first gear set and third gear of the second gear set to the first countershaft shaft.

In still another aspect of the present invention, the third synchronizer assembly selectively connects at least one of the second gear of the third gear set and the second gear of the fifth gear set to the second countershaft shaft.

In still another aspect of the present invention, the fourth synchronizer assembly selectively connects at least one of the third gear of the third gear set and the second gear of the fourth gear set to the first countershaft shaft.

In still another aspect of the present invention, the selective engagement of the dual clutch assembly and at least one of the four synchronizer assemblies establishes at least one of seven forward speed ratios between the input member and the output member.

The above features and advantages and other features and advantages of the present invention are readily apparent from the following detailed description of the best modes for carrying out the invention when taken in connection with the accompanying drawings.

BRIEF DESCRIPTION OF THE DRAWING

FIG. 1 is a schematic cross-section of an embodiment of a seven speed transmission, in accordance with the present invention.

DESCRIPTION

Referring to FIG. 1, a multiple speed transmission is generally indicated by reference number 10. The transmission 10 includes an input member 12 and an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear. For example, the input member 12 may be a clutch housing that is coupled to and receives driving torque from a flywheel.

The input member 12 is continuously connected with an engine (not shown) or other torque producing machine to provide a driving torque to input member 12. The output member or gear 14 rotatably drives a differential assembly 16. The differential assembly 16 transfers torque delivered by output member 14, ultimately, to a pair road wheels (not shown).

The transmission 10 includes a housing 18 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first shaft or member 22, a second shaft or member 24, a first countershaft 26, and a second countershaft 28. The second shaft or member 24 is a sleeve (hollow) shaft that is concentric with and overlies the first shaft or member 22. The first countershaft 26 and the second countershaft 28 are each spaced apart from and parallel with the first and second shaft members 22, 24. The first and second shafts 22, 24 define a first axis of rotation, the first countershaft 26 defines a second axis of rotation and the second countershaft 28 defines a third axis of rotation.

A dual clutch assembly 32 is connected between the input member 12 and the first and second shaft members 22, 24. The dual clutch assembly 32 includes a clutch housing 34 connected for common rotation with the input member 12. Thus, clutch housing 34 which is supported within the transmission housing 18 provides the driving input torque to the transmission gear sets, as will be described in greater detail below. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first shaft or member 22 and the clutch element 38 is connected for common rotation with the second shaft or member 24. Thus, selective engagement of clutch element 36 with the clutch housing 34 connects the input member 12 for common rotation with the first shaft member 22. Selective engagement of clutch element 38 with the clutch housing 34 connects the input member 12 for common rotation with the second shaft member 24.

The gearing arrangement 20 also includes a plurality of co-planar, meshing gear sets 40, 50, 60, 70 and 80. The present invention contemplates that the plurality of co-planar, meshing gear sets 40, 50, 60, 70 and 80 may be arranged axially along shafts 22, 24 in an order other than that which is shown in FIG. 1 and still be within the scope of the invention. Co-planar gear set 40 includes gear 42 and gear 44. Gear 42 is rotatably fixed and connected for common rotation with the second shaft member 24. Gear 44 is selectively connectable for common rotation with the second countershaft member 28 and meshes with gear 42. It should be appreciated that gear 42 may be a separate gear structure fixed to the second shaft member 24 or gear teeth/splines formed on an outer surface of the second shaft member 24 without departing from the scope of the present invention. Gear set 40 is disposed proximate a wall 48 of the transmission housing 18 that is on a front or side of the transmission 10 proximate the dual clutch assembly 32.

Co-planar gear set 50 includes gear 52, gear 54 and gear 56. Gear 52 is rotatably fixed and connected for common rotation with the second shaft member 24 and meshes with gear 54 and gear 56. Gear 54 is selectively connectable for common rotation with the second countershaft member 28. Gear 56 is selectively connectable for common rotation with the first countershaft member 26. Gear set 50 is positioned adjacent gear set 40.

Co-planar gear set 60 includes gear 62, gear 64 and gear 66. Gear 62 is rotatably fixed and connected for common rotation with the first shaft member 22 and meshes with gear 64 and gear 66. Gear 64 is selectively connectable for common rotation with the second countershaft member 28. Gear 66 is selectively connectable for common rotation with the first countershaft member 26. Gear set 60 is disposed adjacent gear set 50.

Co-planar gear set 70 includes gear 72 and gear 74. Gear 72 is rotatably fixed and connected for common rotation with the first shaft member 22 and meshes with gear 74. Gear 74 is selectively connectable for common rotation with the first countershaft member 26. Gear set 70 is positioned adjacent gear set 60.

Co-planar gear set 80 includes gear 82 and gear 84. Gear 82 is rotatably fixed and connected for common rotation with the first shaft member 22 and meshes with gear 84. Gear 84 is selectively connectable for common rotation with the second countershaft member 28. Gear set 80 is positioned between gear set 70 and an end wall 88 of the transmission housing 18.

Reverse gear 90 is selectively connectable for common rotation with the first countershaft member 26 and meshes with a reverse gear portion 92 of stepped gear 44. Reverse gear portion 92 of gear 44 is fixed for common rotation with gear 44 and may have a different gear pitch than the gear pitch of gear 44, as required, to implement a reverse gear speed. Reverse gear 90 is located between gear set 50 and end wall 48.

Further, a first countershaft transfer gear 100 is rotatably fixed and connected for common rotation with the first countershaft member 26. A second countershaft transfer gear 110 is rotatably fixed and connected for common rotation with the second countershaft member 28. First countershaft transfer gear 100 is configured to mesh with output member 14 and the second countershaft transfer gear 110 is configured to mesh with output member 14. However, the first countershaft transfer gear 100 and the second countershaft transfer gear 110 do not mesh with each other. The first countershaft transfer gear 100 is disposed between the reverse gear 90 and end wall 48 of the transmission housing 18. The second countershaft transfer gear 110 is disposed between gear 44 and end wall 48 of the transmission housing 18. The output member 14 is co-planar with first and second countershaft transfer gears 100, 110.

A park gear 112 is provided for placing transmission 10 in a park mode that prevents output member 14 from rotating. Park brake gear 112 is coupled to a park transfer gear 114. Park transfer gear 114 intermeshes with output member 14 and is co-planar with transfer gears 100, 110 and output member 14. Alternatively, the present invention contemplates fixedly disposing park brake gear on one of the first and second countershafts to achieve the park mode function.

The transmission 10 further includes a plurality of selectively engageable synchronizer assemblies 150, 152, 154 and 156. Synchronizers 150, 152, 154 and 156 are double sided synchronizers and generally include a shift fork (not shown) that is bi-directionally translated by an actuator (not shown) into at least two engaged positions and a neutral or disengaged position. In the present embodiment, synchronizer 150 is selectively actuatable to connect gear 44 for common rotation with the second countershaft member 28 and synchronizer 150 is selectively actuatable to connect gear 54 for common rotation with the second countershaft member 28. Synchronizer 152 is selectively actuatable to connect for common rotation reverse gear 90 with the first countershaft 26 and is selectively actuatable to connect for common rotation gear 56 with the first countershaft 26. Synchronizer 154 is selectively actuatable to connect for common rotation gear 64 with the second countershaft 28 and is selectively actuatable to connect for common rotation gear 84 with the second countershaft 28. Synchronizer 156 is selectively actuatable to connect for common rotation gear 66 with the first countershaft member 26 and is selectively actuatable to connect for common rotation gear 74 with the first countershaft member 26.

The transmission 10 is capable of transmitting torque from the input shaft 12 to the output gear member 14 in at least seven forward torque ratios and at least one reverse torque ratio. Each of the forward torque ratios and the reverse torque ratio is attained by selective engagement of the dual clutch assembly 32 and one or more of the synchronizer assemblies 150, 152, 154 and 156. Those skilled in the art will readily understand that a different speed ratio is associated with each torque ratio.

It should be appreciated that each individual gear set 40, 50, 60, 70 and 80 provides one or more forward and/or reverse gear ratios upon selective engagement of the synchronizer assemblies 150, 152, 154 and 156. It should also be appreciated that a particular forward or reverse speed ratio may be achieved by different combinations of synchronizer and associated gear sets without departing from the scope of the present invention.

For example, to establish the reverse torque ratio, clutch element 38 is engaged and synchronizer 152 is activated. Clutch element 38 couples the input member 12 with the second shaft member 24. Synchronizer 152 connects reverse gear 90 to the first countershaft member 26. More specifically, input torque from the input shaft 12 is transferred through the dual clutch assembly 32 to the second shaft member 24, through gear 42 to gear 44, through gear 44 to reverse gear 90, from gear 90 to the first countershaft member 26 through synchronizer 152 to first countershaft transfer gear 100 and from first countershaft transfer gear 100 to the output member 14.

To establish a first forward torque ratio (i.e. a 1st gear), clutch element 36 is engaged and synchronizer 154 is activated. Clutch element 36 couples the input member 12 with the first shaft member 22. Synchronizer 154 couples gear 84 to the second countershaft member 28. Input torque from the input member 12 is transferred through the dual clutch assembly 32 to the first shaft member 22 to gear 82. Gear 82 transfers torque to gear 84 which transfers the torque to the second countershaft member 28 through synchronizer 154 and to second countershaft transfer gear 110 and then from second countershaft transfer gear 110 to the output member 14.

To establish a second forward torque ratio (i.e. a 2nd gear), clutch element 38 is engaged and synchronizer 150 is activated. Clutch element 38 couples the input member 12 to the second shaft member 24 which rotates gear 42. Synchronizer 150 couples gear 44 to the second countershaft member 28. Accordingly, input torque from the input member 12 is transferred through the dual clutch assembly 32 to the second shaft member 24, through gear 42 to gear 44, from gear 44 to synchronizer 150, from synchronizer 150 to the second countershaft member 28 and from the second countershaft member 28 to the second countershaft transfer gear 110 and the output member 14.

To establish a third forward torque ratio (i.e. a 3rd gear), clutch element 36 is engaged and synchronizer 156 is activated. Clutch element 36 couples the input member 12 to the first shaft member 22 which rotates gear 72. Synchronizer 156 couples gear 74 to the first countershaft member 26. Thus, input torque from the input member 12 is transferred through the dual clutch assembly 32 to the first shaft member 22, through gear 72 to gear 74, through gear 74 to synchronizer 156, from synchronizer 156 to the first countershaft member 26, from the first countershaft member 26 to the first countershaft transfer gear 100 and then from first countershaft transfer gear 100 to the output member 14.

To establish a fourth forward torque ratio (i.e. a 4th gear), clutch element 38 is engaged and synchronizer 152 is activated. Clutch element 38 couples the input member 12 to the second shaft member 24 which rotates gear 52. Synchronizer 152 couples gear 56 to the first countershaft member 26. Thus, input torque from the input member 12 is transferred through the dual clutch assembly 32 to the second shaft member 24 to gear 52, then from gear 52 to gear 56, from gear 56 to synchronizer 152, from synchronizer 152 to the first countershaft member 26, from the first countershaft member 26 to first countershaft transfer gear 100 and then from first countershaft transfer gear 100 to the output member 14.

To establish a fifth forward torque ratio (i.e. a 5th gear), clutch element 36 is engaged and synchronizer 156 is activated. Clutch element 36 couples the input member 12 to the first shaft member 22 which rotates gear 62. Synchronizer 156 couples gear 66 to the first countershaft member 26. Input torque from the input member 12 is transferred through the dual clutch assembly 32 to the first shaft member 22, from first shaft member 22 to gear 62, from gear 62 to gear 66, from gear 66 to the first countershaft member 26 through synchronizer 156, to first countershaft transfer gear 100 and from first countershaft transfer gear 100 to the output member 14.

To establish a sixth forward torque ratio (i.e. a 6th gear), clutch element 38 is engaged and synchronizer 150 is activated. Clutch element 38 couples the input member 12 to the second shaft member 24 which rotates gear 52. Synchronizer 150 couples gear 54 to the second countershaft member 28. Thus, input torque from the input member 12 is transferred through the dual clutch assembly 32 to the second shaft member 24 to gear 52, then from gear 52 to gear 54, from gear 54 to synchronizer 150, from synchronizer 150 to the second countershaft member 28, from the second countershaft member 28 to second countershaft transfer gear 110 and then from second countershaft transfer gear 110 to the output member 14.

To establish a seventh forward torque ratio (i.e. a 7th gear), clutch element 36 is engaged and synchronizer 154 is activated. Clutch element 36 couples the input member 12 to the first shaft member 22 which rotates gear 62. Synchronizer 154 couples gear 64 to the second countershaft member 28. Input torque from the input member 12 is transferred through the dual clutch assembly 32 to the first shaft member 22, from first shaft member 22 to gear 62, from gear 62 to gear 64, from gear 64 to the second countershaft member 28 through synchronizer 154, to second countershaft transfer gear 110 and from second countershaft transfer gear 110 to the output member 14.

Again, it should be appreciated that any one of the gear sets of gear sets 40, 50, 60, 70 and 80 may be changed to produce a certain forward and reverse torque ratio without departing from the scope of the present invention.

The present invention contemplates that a variety of torque ratios (i.e., the ratio of torque of the output member 14 to the input member 12) and ratio steps are achievable through the selection of tooth counts of the gears of the transmission 10. The present invention has many advantages and benefits over the prior art. For example, the utilization of four synchronizers allows the use of four rails having one fork on each rail. Thus, a transmission having a more simplified actuation and control system, reduced mass and cost and improved packaging is achieved.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member;
an output member;
a plurality of gear sets, wherein each gear set has a first gear in mesh with a second gear;
a plurality of interconnecting members, wherein each of the first gears of each of the plurality of gear sets are fixed for common rotation to one of the plurality of interconnecting members and each of the plurality of interconnecting members are selectively connected to the input member by one of a plurality of torque transmitting mechanisms;
a plurality of countershafts, wherein each of the second gears of the plurality of gear sets are selectively connected for common rotation to one of the plurality of countershafts; and a plurality of synchronizer assemblies each selectively coupling one of a pair of the second gears of the plurality of gear sets to one of the plurality of countershafts, and wherein the selective engagement of one of a plurality of torque transmitting mechanisms and one of the plurality of synchronizer assemblies establishes one of a plurality of forward speed ratios between the input member and the output member and a first and a second of the plurality of gear sets each further include a third gear in mesh with the respective first gear and wherein the third gears are selectively connectable for common rotation to one of the plurality of countershafts.

2. The transmission of claim 1 further comprising a differential assembly, and wherein the plurality of countershafts each include a transfer gear in constant mesh with the output member.

3. The transmission of claim 2 further comprising a park gear and a park transfer gear, wherein the park gear is rotatably supported by one of the plurality of countershafts and rotatably connected to the park transfer gear which is in constant mesh with the output gear of the differential assembly.

4. The transmission of claim 1 wherein the third gear of the first of the plurality of gear sets in mesh with the second gear and wherein the third gear is selectively connectable for common rotation to one of the plurality of countershafts.

5. The transmission of claim 1 wherein the second gear of the first of the plurality of gear sets includes a first portion meshed with the first gear and having a first diameter and a second portion having a second diameter that is different from the first diameter.

6. The transmission of claim 5 wherein the third gear of the first of the plurality of gear sets in mesh with the second portion of the second gear and selectively connectable to one of the plurality of countershafts.

7. The transmission of claim 1 wherein the plurality of gear sets include a third, fourth, and fifth gear sets, wherein the third gear of the first of the plurality of gear sets is selectively connectable to one of the countershafts and in mesh with the second gear of the first gear set, the third gear of the second gear set is selectively connectable to one of the countershafts and in mesh with the first gear of the second gear set, the third gear set further includes a third gear selectively connectable to one of the countershafts and in mesh with the first gear of the third gear set.

8. The transmission of claim 7 wherein a first of the plurality of interconnecting members is fixed for common rotation with each of the first gears of the third, fourth and fifth gear set.

9. The transmission of claim 8 wherein a second of the plurality of interconnecting members is fixed for common rotation with each of the first gears of the first and second gear sets and wherein the second of the plurality of interconnecting members is concentric with and at least partially surrounds the first of the plurality of interconnecting.

10. The transmission of claim 9 wherein a first of the plurality of countershafts is disposed parallel with the first and second of the plurality of interconnecting members, wherein the third gear of the first gear set, the third gear of the second gear set, the third gear of the third gear set and the second gear of the fourth gear set are each selectively connectable for common rotation with the first of the plurality of countershafts.

11. The transmission of claim 10 wherein a second of the plurality of countershafts is disposed parallel with the first and second of the plurality of interconnecting members, wherein the second gear of the first gear set and the second gear of the second gear set are each selectively connectable for common rotation with the second of the plurality of countershafts.

12. The transmission of claim 11 further including a dual clutch assembly including a first and a second of the plurality of torque transmitting mechanisms.

13. A transmission comprising:
an input member;
a plurality of gear sets, wherein each gear set has a first gear in mesh with a second gear;
a plurality of interconnecting members, wherein each of the first gears of each of the plurality of gear sets are fixed for common rotation to one of the plurality of interconnecting members and each of the plurality of interconnecting members are selectively connected to the input member by one of a plurality of torque transmitting mechanisms;
a plurality of countershafts, wherein each of the second gears of the plurality of gear sets are selectively connected for common rotation to one of the plurality of countershafts;
a differential assembly having an output gear, and wherein the plurality of countershafts each include a transfer gear in constant mesh with the output gear of the differential assembly;
a park gear and a park transfer gear, wherein the park gear is rotatably supported by one of the plurality of countershafts and rotatably connected to the park transfer gear which is in constant mesh with the output gear of the differential assembly;
a plurality of synchronizer assemblies each selectively coupling one of a pair of the second gears of the plurality of gear sets to one of the plurality of countershafts, and
wherein the selective engagement of one of a plurality of torque transmitting mechanisms and one of the plurality of synchronizer assemblies establishes one of a plurality of forward speed ratios between the input member and the output gear and a first and a second of the plurality of gear sets each further include a third gear in mesh with the respective first gear and wherein the third gears of each of the first and second of the plurality of gear sets are selectively connectable for common rotation to one of the plurality of countershafts.

14. The transmission of claim 13 wherein a third of the plurality of gear sets further includes a third gear in mesh with the second gear and wherein the third gear of the third of the plurality of gear sets is selectively connectable for common rotation to one of the plurality of countershafts.

15. The transmission of claim 13 wherein the second gear of a first of the plurality of gear sets includes a first portion meshed with the first gear and having a first diameter and a second portion having a second diameter that is different from the first diameter.

16. The transmission of claim 15 wherein the third gear of the first of the plurality of gear sets in mesh with the second portion of the second gear and wherein the third gear is selectively connectable to one of the plurality of countershafts.

17. The transmission of claim 13 wherein the plurality of gear sets include a third, fourth, and fifth gear sets, wherein the third gear of the first of the plurality of gear sets is selectively connectable to one of the countershafts and in mesh with the second gear, the third gear of the second gear set is selectively connectable to one of the countershafts and in mesh with the first gear, the third gear set further includes a third gear selectively connectable to one of the countershafts and in mesh with the first gear.

18. The transmission of claim 17 wherein a first of the plurality of interconnecting members is fixed for common rotation with each of the first gears of the third, fourth and fifth gear set.

19. The transmission of claim 18 wherein a second of the plurality of interconnecting members is fixed for common rotation with each of the first gears of the first and second gear sets and wherein the second of the plurality of interconnecting members is concentric with and at least partially surrounds the first of the plurality of interconnecting members.

20. The transmission of claim 19 wherein a first of the plurality of countershafts is disposed parallel with the first and second of the plurality of interconnecting members, wherein the third gear of the first gear set, the third gear of the second gear set, the third gear of the third gear set and the second gear of the fourth gear set are each selectively connectable for common rotation with the first of the plurality of countershafts.

21. The transmission of claim 20 wherein a second of the plurality of countershafts is disposed parallel with the first and second of the plurality of interconnecting members, wherein the second gear of the first gear set and the second gear of the second gear set are each selectively connectable for common rotation with the second of the plurality of countershafts.

22. The transmission of claim 21 further including a dual clutch assembly including a first and a second of the plurality of torque transmitting mechanisms.

23. The transmission of claim 13 wherein each of the first gears of the third, a fourth, and a fifth of the plurality of gear sets are fixed for common rotation with a first of the plurality of interconnecting members.

24. The transmission of claim 23 wherein a second of the plurality of interconnecting members is fixed for common rotation with each of the first gears of the first and second of the plurality of gear sets and wherein the second of the plurality of interconnecting members is concentric with and at least partially surrounds the first of the plurality of interconnecting members.

25. The transmission of claim 24 wherein a first of the plurality of countershafts is disposed parallel with the first and second of the plurality of interconnecting members, wherein the third gear of each of the first, the second and the third of the plurality of gear sets, and the second gear of the fourth of the plurality of gear sets are each selectively connectable for common rotation with the first of the plurality of countershafts.

26. The transmission of claim 25 wherein a second of the plurality of countershafts is disposed parallel with the first and second of the plurality of interconnecting members, wherein the second gear of the first and the second of the plurality of gear sets are each selectively connectable for common rotation with the second of the plurality of countershafts.

27. The transmission of claim 26 further including a dual clutch assembly including a first and a second of the plurality of torque transmitting mechanisms.

28. The transmission of claim 27 wherein the first of the plurality of gear sets is adjacent the dual clutch assembly, the second of the plurality of gear sets is adjacent the first of the plurality of gear sets, the third of the plurality of gear sets is adjacent the second of the plurality of gear sets, the fourth of the plurality of gear sets is adjacent the third of the plurality of gear sets, and the fifth of the plurality of gear sets adjacent the fourth of the plurality of gear sets.

29. The transmission of claim 28 wherein the plurality of torque transmitting mechanisms is a dual clutch assembly and includes a first clutch and a second clutch, wherein the second clutch is configured to selectively connect the input member to a second of the plurality of interconnecting members and wherein the plurality of synchronizer assemblies includes a first synchronizer assembly for selectively connecting the second gear of the first of the plurality of gear sets to the second of the plurality of countershafts to establish a second gear ratio.

30. The transmission of claim 29 wherein the first synchronizer assembly selectively connects the second gear of the second of the plurality of gear sets to the second of the plurality of countershafts to establish a sixth gear ratio.

31. The transmission of claim 30 wherein the plurality of synchronizer assemblies includes a second synchronizer assembly for selectively connecting a third gear of the first of the plurality of gear sets to the first of the plurality of countershafts to establish a reverse gear ratio.

32. The transmission of claim 31 wherein the second synchronizer assembly selectively connects a third gear of the second of the plurality of gear sets to the first of the plurality of countershafts to establish a fourth gear ratio.

33. The transmission of claim 32 wherein the first clutch is configured to selectively connect the input member to the first of the plurality of interconnecting members and wherein the plurality of synchronizer assemblies includes a third synchronizer assembly for selectively connecting the second gear of the third of the plurality of gear sets to the second of the plurality of countershafts to establish a seventh gear ratio.

34. The transmission of claim 33 wherein the third synchronizer assembly selectively connects the second gear of the fifth of the plurality of gear set to the second of the plurality of countershafts to establish a first gear ratio.

35. The transmission of claim 34 wherein the four synchronizer assemblies includes a fourth synchronizer assembly for selectively connecting the third gear of the third of the plurality of gear sets to the first of the plurality of countershafts to establish a fifth gear ratio.

36. The transmission of claim 35 wherein the fourth synchronizer assembly selectively connects the second gear of the fourth of the plurality of gear sets to the first of the plurality of countershafts to establish a third gear ratio.

* * * * *